Patented May 11, 1937

2,080,001

UNITED STATES PATENT OFFICE 2,080,001

WELDING CHROMIUM ALLOY STEELS

Frederick M. Becket, New York, and Russell Franks, Niagara Falls, N. Y., assignors, by mesne assignments, to Union Carbide and Carbon Corporation, a corporation of New York No Drawing. Application July 6, 1935, Serial No. 30,160

10 Claims. (Cl. 113—112)

The invention relates to the welding of steels which contain substantial proportions of chromium and in which at least most of the iron is in the ferritic condition at ordinary atmospheric temperatures. The invention provides a novel welded joint and a new and improved method of welding.

Welds obtained by known procedures in chromium steels of the ferritic type are ordinarily brittle and tend to crack under stress or flection. The addition of a suitable proportion of titanium to these chromium steels renders them much less susceptible to hardening and embrittling by the effect of heating and cooling; but a tough, ductile weld cannot be made even in these steels by ordinary welding methods.

The present invention is based on our discovery that ductile welds may be obtained in low carbon (less than about 0.3% carbon) chromium and chromium-titanium steels of the ferritic type, by introducing a suitable proportion of columbium into the weld filler material of the completed weld.

The proper amount of columbium is preferably introduced into the weld filler material as an alloyed constituent of the welding rod; but, in the form of columbium metal or a columbium alloy, or of a mixture of a columbium compound and a reducing agent such as silicon, it may be applied, either alone or in admixture with fluxing materials, as a loose powder or paste or as a coating on the welding rod.

The method of the invention comprises, broadly, uniting the adjacent edges of two or more ferritic chromium steel articles by a fusion welding method wherein there is introduced between said edges weld filler metal containing a substantial proportion of chromium and there is simultaneously introduced into the weld filler metal sufficient columbium to provide in said filler metal a ratio (by weight) of columbium to carbon of at least about six and not over thirty. Preferably, the total amount of columbium remaining in the completed weld exceeds eight times the carbon content but does not exceed about 1.5% plus ten times the carbon content of said weld filler material.

Although the advantages of this method are more conspicuous when it is applied to steels containing less than about 20% chromium than when it is applied to steels containing greater percentages of chromium, the invention nevertheless offers distinct advantages for welding any low carbon chromium ferritic type chromium steel containing about 2% to about 30% chromium and up to about 0.3% carbon. The steel forming the body portions adjacent to the seam of the completed weld preferably contains titanium in a proportion sufficient to inhibit the tendency of the steel to harden when cooled in air from welding temperatures (a ratio of titanium to carbon upwards of about four, but not more than 1% excess titanium over this ratio of four). Both the said body portions and the weld filler material may also contain minor percentages, say up to 2% each, of elements which do not destroy the ductility of the weld, for example: tungsten or molybdenum, manganese, or silicon. A small amount of tantalum may accompany the columbium.

The heat for practicing the method of the invention may be supplied either by combustion of a gas (e. g. an oxyacetylene flame) or by electrical heating.

The excellent ductility of welds embodying the invention is illustrated by the data obtained by subjecting several such welds to a standard bending test. This test consists in welding the adjacent edges of two pieces of plate ⅛ inch thick, grinding off any excess filler metal above the surfaces of the plates, cutting a coupon about 8 inches long and 2 inches wide, a portion of the welded joint being about in the center of the coupon and transverse to the longer axis of the coupon, holding one end of the coupon in a heavy vise, bending the coupon by means of hammer blows applied at the free end thereof until the weld just begins to crack, and then measuring the approximate angle of bend. This angle of bend is given under the heading "Bend test" in the following table of data. Under the headings "Rod analysis" and "Plate analysis" appear the respective analyses of the welding rods and plates used for the tests, the remainder of the metal in each case being iron together with small fractional percentages of silicon and manganese. All of the columbium introduced into the welds in these tests was introduced as an alloyed constituent of the welding rods.

| Rod analysis | | | | Plate analysis | | | Bend tests | |
|---|---|---|---|---|---|---|---|---|
| Cr | C | Cb | Ti | Cr | C | Ti | (A) | (B) |
| Percent | Per-cent | Per-cent | Per-cent | Per-cent | Per-cent | Per-cent | Degrees | Degrees |
| 5.09 | 0.07 | None | None | 5.09 | 0.07 | None | <10 | <10 |
| 5.93 | 0.12 | None | 0.90 | 5.93 | 0.12 | 0.90 | <10 | <10 |
| 6.30 | 0.07 | 1.00 | None | 6.29 | 0.06 | 0.58 | 45 | 180 |
| 6.34 | 0.07 | 1.55 | None | 5.95 | 0.12 | 0.80 | 90 | 160 |
| 13.52 | 0.07 | None | None | 13.52 | 0.07 | None | <10 | <10 |
| 13.19 | 0.07 | 2.17 | None | 13.52 | 0.07 | None | 85 | 50 |
| 13.19 | 0.07 | 2.17 | None | 13.35 | 0.11 | 0.85 | 110 | 150 |
| 25.20 | 0.12 | None | None | 25.20 | 0.12 | None | <10 | <10 |
| 25.40 | 0.10 | 2.11 | None | 25.20 | 0.12 | None | 22 | |
| 25.40 | 0.10 | 2.11 | None | 25.60 | 0.12 | 0.70 | 50 | 90 |

(A) Weld in condition as formed, no heat treatment.
(B) Weld heated for 1 to 3 minutes at about 900° C. and air cooled.

As indicated in the above table, the ductility of the welds is substantially improved if they are heated for several minutes at about 800° C. to about 1000° C. and then permitted to cool freely in air. The heating may conveniently be done with an oxyacetylene welding flame. A longer heating period, up to about two hours, further improves the toughness and ductility of the welds.

This application contains subject matter in common with our application Serial No. 694,058, filed October 18, 1933.

We claim:

1. A method of uniting adjacent edges of ferritic steel articles substantially free from columbium and containing about 2% to 30% chromium and up to about 0.3% carbon, which comprises depositing between said edges molten weld filler metal composed of low carbon chromium ferritic steel and introducing columbium into said molten weld filler metal.

2. A method of uniting adjacent edges of ferritic steel articles substantially free from columbium and containing about 2% to 30% chromium and up to about 0.3% carbon, which comprises depositing between said edges molten weld filler metal composed of low carbon chromium ferritic steel and introducing columbium into said molten weld filler metal in an amount sufficient to produce in said filler metal a ratio of columbium to carbon of at least about 6 and not over 30.

3. A method of uniting adjacent edges of ferritic steel articles substantially free from columbium and containing about 4% to 20% chromium and up to about 0.3% carbon, which comprises depositing between said edges molten weld filler metal composed of low carbon chromium ferritic steel and introducing columbium into said molten weld filler metal in an amount at least 8 times, but not exceeding 1.5% plus 10 times, the carbon content of said filler metal.

4. A method of uniting adjacent edges of ferritic steel articles substantially free from columbium and containing about 4% to 20% chromium and up to about 0.3% carbon, by depositing between said edges molten weld filler metal composed of ferritic steel containing about 4% to 20% chromium and up to about 0.3% carbon, wherein columbium is introduced into said molten weld filler metal in an amount at least 8 times, but not exceeding 1.5% plus 10 times, the carbon content of said filler metal.

5. A method of uniting adjacent edges of ferritic steel articles substantially free from columbium and containing about 4% to 20% chromium, up to about 0.3% carbon, and titanium in an amount sufficient to inhibit the tendency of the steel to harden when cooled in air from welding temperatures which comprises depositing between said edges molten weld filler metal composed of low carbon chromium ferritic steel and introducing columbium into said molten weld filler metal in an amount at least 8 times, but not exceeding 1.5% plus 10 times, the carbon content of said filler metal.

6. A method of producing a strong and ductile joint between adjacent edges of ferritic steel articles substantially free from columbium and containing about 4% to 20% chromuim and up to about 0.3% carbon, which method comprises depositing a weld filler metal between said edges by fusion deposition from a ferritic steel welding rod containing about 4% to 20% chromium, up to about 0.3% carbon, and columbium in an amount at least 8 times, but not over 1.5% plus 10 times, the carbon content of said welding rod.

7. A method of producing a strong and ductile joint between adjacent edges of ferritic steel articles substantially free from columbium and containing about 2% to 30% chromium and up to about 0.3% carbon, which method comprises depositing between said edges, by fusion deposition from a ferritic steel welding rod containing about 2% to about 30% chromium and up to about 0.3% carbon, a weld filler metal, and simultaneously with said deposition introducing into said filler metal columbium in an amount at least 8 times, but not exceeding 1.5% plus 10 times, the carbon content of said filler metal; cooling and solidifying the deposited metal; subsequently reheating the joint for several minutes at a temperature between about 800° C. and about 1000° C.; and then cooling the joint in air.

8. A ductile joint comprising adjacent edges of at least two body portions and weld filler metal between and uniting said adjacent edges, said body portions and said filler metal being composed of ferritic steel containing about 2% to 30% chromium and up to about 0.3% carbon, at least one of said body portions being substantially free from columbium, and said filler metal containing columbium.

9. A ductile joint comprising adjacent edges of at least two body portions and weld filler metal between and uniting said adjacent edges, said body portions and said filler metal being composed of ferritic steel containing about 4% to 20% chromium and up to about 0.3% carbon, at least one of said body portions being substantially free from columbium, and said filler metal containing columbium in an amount at least 6 times, but not exceeding 1.5% plus 10 times, the carbon content of said filler metal.

10. A ductile joint comprising adjacent edges of at least two body portions and weld filler metal between and uniting said adjacent edges, said body portions and said filler metal being composed of ferritic steel containing about 4% to 20% chromium and up to about 0.3% carbon, at least one of said body portions being substantially free from columbium and containing titanium in an amount sufficient to inhibit the tendency of the steel to harden when cooled in air from welding temperatures, and said filler metal containing columbium in an amount at least 8 times, but not exceeding 1.5% plus 10 times, the carbon content of said filler metal.

FREDERICK M. BECKET.
RUSSELL FRANKS.